United States Patent [19]

Pettifer

[11] 4,102,078

[45] Jul. 25, 1978

[54] BUDDING GUN

[76] Inventor: Lionel Joseph William Pettifer, c/o Industrial Development (Bangor), University College of North Wales, Dean St., Bangor, Wales

[21] Appl. No.: 808,471

[22] Filed: Jun. 21, 1977

[51] Int. Cl.² ............................................. A01G 1/00
[52] U.S. Cl. ....................................................... 47/7
[58] Field of Search ............... 47/7; 30/299, 304, 305, 30/123.3–128, 136, 136.5

[56] References Cited

U.S. PATENT DOCUMENTS

| 34,328 | 2/1862 | Gird et al. | 47/7 |
| 449,591 | 3/1891 | Rowell | 47/7 |
| 613,031 | 10/1898 | Gilbert et al. | 47/7 |
| 870,096 | 11/1907 | Haley | 47/7 |
| 1,925,952 | 9/1933 | Cox, Jr. | 47/7 X |

FOREIGN PATENT DOCUMENTS

| 14,172 | 1/1920 | Australia | 47/7 |
| 566,452 | 2/1924 | France | 47/7 |
| 352,605 | 4/1922 | Fed. Rep. of Germany | 47/7 |
| 587,159 | 10/1933 | Fed. Rep. of Germany | 47/7 |

*Primary Examiner*—E. H. Eickholt
*Attorney, Agent, or Firm*—Anthony J. Casella

[57] ABSTRACT

A device for use by gardeners when budding, that is, when excizing a bud from a plant and transferring the bud to another part of the same plant or to a different plant. The device, termed a budding gun, comprises first cutting means for excizing and receiving a bud, second cutting means for cutting the bark at a position to receive the bud and operable to lift the bark to expose the underlying wood and ejector means associated with the first cutting means and operable to eject and plant the bud in the wood behind the bark lifted by the second cutting means.

2 Claims, 3 Drawing Figures

BUDDING GUN

The present invention concerns a device for excising a member from a first position and planting the member in a second position. In particular the invention concerns a device for budding and will hereinafter be termed a "budding gun".

Budding involves taking an eye or bud attached to a portion of the bark of a plant and transferring the eye or bud to another part of the same plant or to a different plant. The process is generally confined to woody plants and is particularly suitable for roses and fruit trees. However it is not restricted to these varieties of plants and can be practised, for example, on herbaceous perennials, ornamental deciduous trees such as Acers and evergreen shrubs such as Rhododendrons.

When budding roses by hand a gardener or nursery man requires, amongst other steps, to despine the bud stick, that is to remove the thorns, prior to the budding operation. The present invention seeks to provide a device that can eliminate the despining step and which can result in savings in time and cost of budding.

According to one aspect of the present invention a budding gun comprises first cutting means for excising and receiving a bud, second cutting means for cutting the bark or rind at a position to receive the bud and operable to lift the bark or rind to expose the underlying wood and ejector means associated with the first cutting means and operable to eject and plant the bud in the wood behind the bark or rind lifted by the second cutting means.

According to another aspect of the present invention a budding gun comprises a frame assembly supporting an axially movable tube terminating at one end in a cutting edge and a pair of pivotable cutting blades disposed one on each side of the said one end of the tube and inclined to the longitudinal axis of the tube, the cutting blades being urged together to form a single cutting edge substantially on and normal to the axis of the tube, a spring-loaded plunger slidable within the tube between a retracted position and an extended position in which the leading end of the plunger protrudes beyond said one end of the tube, and releasable securing means for retaining the plunger in the retracted position whereby, in use, the tube is first advanced axially to pivotally open and project beyond the cutting blades to excise and store a bud, the tube is then withdrawn to allow the cutting blades to pivotally close and form the single cutting edge and thereafter the single cutting edge is utilised to make an incision in the bark or rind at a position to receive the stored bud, the tube is again moved axially to open the cutting blades to thereby lift the bark or rind on each side of the incision and the plunger is released to eject the stored bud into the incision.

The invention will be described further, by way of example, with reference to the accompanying drawings; in which.

Figure 2:
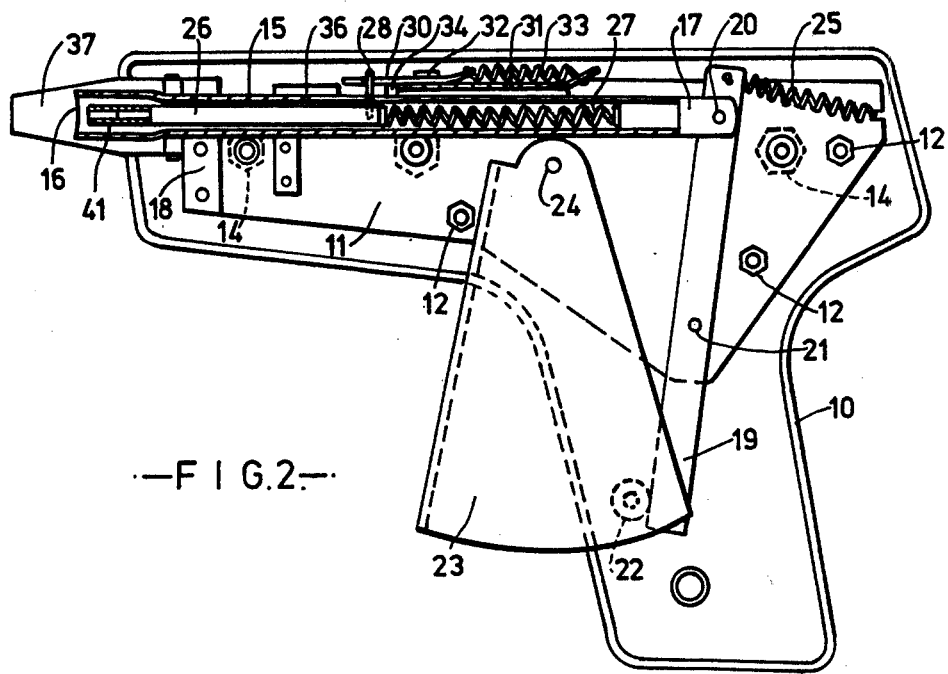
FIG. 2 is a view corresponding to FIG. 1, partly in section, and with a part of a casing removed to show the interior of the budding gun.

The illustrated budding gun is in the form of a pistol, the pistol having a casing 10 formed in two substantially identical parts about the longitudinal centre line of the gun. The casing is preferably formed from a robust plastics material. In FIG. 2 one of the casing parts is removed to reveal the interior of the gun.

Two spaced apart side plates 11 are arranged within the casing. The side plates 11 are maintained in spaced apart parallel relationship by spacer members 12. The casing parts are in turn secured to the side plates by screws 13 engageable in hankbushes 14 in the side plates.

An elongate hollow metal tube 15 terminating at one end, its forward or leading end, in a cutting edge 16 and having a clevis 17 at its opposite end is arranged between the side plates 11. Conveniently the cutting edge 16 is curved and the end of the tube at the cutting edge is elliptical. At its forward end the tube passes through a block 18 fixed to the side plates 11 and an end of a lever 19 is pivotally connected to the clevis by a pin 20. The lever itself is pivotable about an axis 21 extending between the side plates and passing through the lever. The free end of the lever, that is the end of the lever remote from the clevis, bears against a roller 22 carried on a trigger 23. The trigger 23 in turn is pivotable about a further axis 24 carried by the side plates. A spring 25 extends from the end of the lever at the clevis to one of the side plates. This spring 25 urges the lever 19 to pivot in a clockwise direction (as viewed in FIG. 2) about its pivot axis 21 whereby to urge the free end of the lever into contact with the roller 22 and to maintain the tube in a withdrawn position between the side plates.

A plunger 26 is slidable within the tube 15. The plunger is urged towards the forward or leading end of the tube by means of a compression spring 27 disposed within the tube 15 between the plunger and the clevis. A pin 28 carried by the plunger extends through a slot 29 in the wall of the tube, the pin 28 being engaged by a pawl 30 carried by an inverted U-shaped saddle 31 which is fixedly secured to the tube. The pawl 30 is pivotable about a rivet pin 32 carried on the saddle and the pawl is urged into engagement with the pin 28 by means of a spring 33 extending between an end of the pawl and an adjacent end of the saddle.

The pawl 30 is provided with a catch 34 which extends downwardly therefrom and is spaced from the side of the saddle. This downwardly extending catch 34 cooperates with a guide 36 secured to one of the side plates 11. The side plates are cut away to accommodate the downwardly extending catch and the guide.

Figure 1:
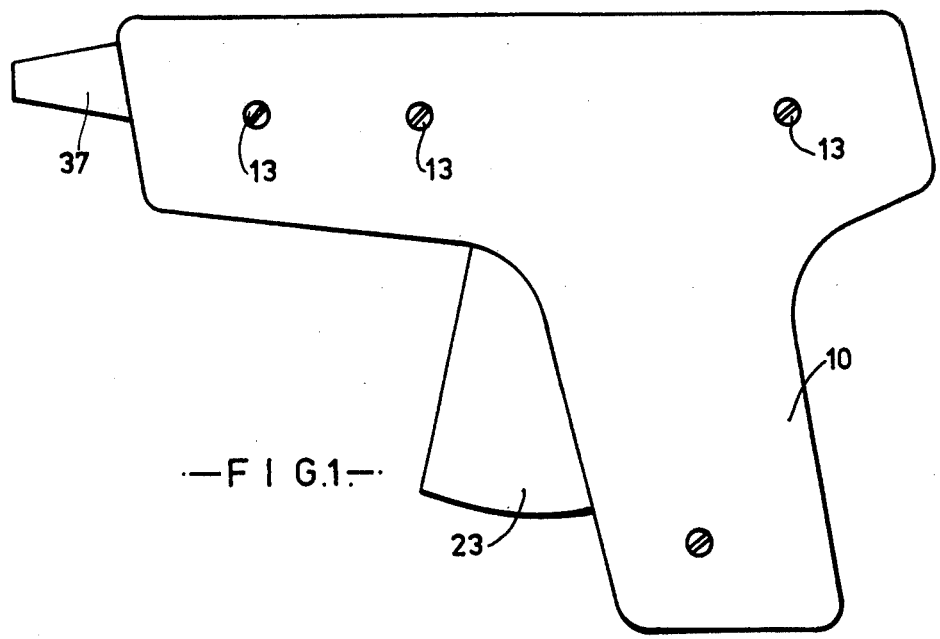
FIG. 1 is a side view of an assembled budding gun.

Each side plate carries a flat cutting blade 37 terminating in a cutting edge. The blades are each connected to the respective side plates by hinges 38, each hinge comprising a spindle passing through a sleeve at the forward end of the side plate and corresponding collars on the blade. The blades are urged together by springs 39 disposed about the spindles into a position in which their ends are contiguous and form a single cutting edge 40 disposed substantially normal to the axis of the tube 15. The blades project beyond the casing as seen from FIG. 1 and as seen from FIG. 2 the forward end of the tube is in its inoperative position located rearwardly of the cutting edge 40 and between the blades 37.

A plastics or rubber sleeve 41 is preferably fitted to the leading end of the plunger, the sleeve fitting over a reduced diameter end portion of the plunger.

Figure 3:
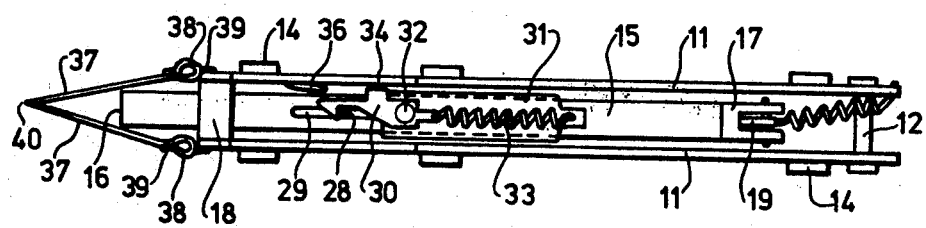
FIG. 3 is a plan of the interior of the budding gun.

In use, the budding gun is held in the hand of an operator in the manner of a pistol. The tube is aligned with a bud to be removed and a squeezing of the trigger causes the tube to move in a forward direction (to the left as viewed in the drawings) to part the cutting blades 37. The pawl 30 moves with the tube and the downwardly projecting catch 34 thereon contacts the end of the guide 36 which is directed across the path of travel of the catch. As a result, the pawl is caused to move across the surface of the guide 36 which is directed away from the tube 15 and is thereby caused to pivot about its axis 32 in a clockwise direction as seen in FIG. 3 to release the pin 28 and the plunger 26. The arrangement is such that the pin 28 is released when the tube 15 has been displaced to a position at which its cutting edge 16 substantially in line with the cutting edges of the parted blades. Immediately, the pin is released the compression spring 27 within the tube displaces the plunger and the rubber or plastics sleeve 41 projects beyond the end of the tube 15. The movement of the plunger is arrested when the pin strikes the end of the slot 29 in the tube or, if the slot passes beneath the block 18, when the pin strikes the block.

Continued squeezing of the trigger 23 causes the tube 15 to extend outwardly beyond the cutting edges of the blades. The plunger is now stationary and the tube passes over the rubber or plastics sleeve 41 until the latter is again recessed within the end of the tube. In this position the catch 34 has passed over and clear of the guide 36 and the pawl 30 pivots about its axis under action of its spring 33 to reengage the pin 28 on the plunger 26. Upon releasing the trigger the tube, together with the plunger, return to their initial position under the action of the spring 25. On its return movement the catch 34 passes through the gap or clearance between the tube 15 and the guide 36. The guide 36 is formed from thin metal strip and is capable of flexing.

Thus in use, the trigger is squeezed to extend the cutting edge 16 beyond the cutting blades and the cutting edge 16 is pressed through the rind or bark to the underlying wood, preferably with a short twisting motion. The excised bud is stored in the end of the tube and the trigger 23 is released. The tube retracts and the cutting blades return to their initial position to form the single combined cutting edge 40 in front of the tube 15.

The cutting blades are now pushed through the rind or bark at a selected position to receive the bud stored in the end of the tube. The cut is such as to reach the underwood. The trigger is again squeezed to cause the tube to part the blades and in so doing to part the rind or bark. The plunger is then released as a result of the displacement of the pawl to eject the stored bud into the incision between the parted rind or bark.

The gun is then removed and the parted rind or bark closes about the bud. The cut can be bound or sealed, conveniently by a spray of sealing compound.

I claim:

1. A budding gun comprising a frame assembly supporting an axially movable tube terminating at one end in a cutting edge and a pair of pivotable cutting blades disposed one on each side of the said end of the tube and inclined to the longitudinal axis of the tube, the cutting blades being urged together to form a single cutting edge substantially on and normal to the axis of the tube, a spring-loaded plunger slidable within the tube between a retracted position and an extended position in which the leading end of the plunger protrudes beyond said one end of the tube, and releasable securing means for retaining the plunger in the retracted position whereby in use the tube is first advanced axially relative to the cutting blades to pivotally open and project beyond the cutting blades to excise and store a bud, the tube being then withdrawn to allow the cutting blades to pivotally close and form the single cutting edge and thereafter the single cutting edge is utilised to make an incision in the bark or rind at a position to receive the stored bud, the tube is again moved axially to open the cutting blades to thereby lift the bark or rind on each side of the incision and the plunger is released to eject the stored bud into the incision.

2. A budding gun as claimed in claim 1 including means urging the tube into its withdrawn position.

* * * * *